United States Patent [19]

Kaneko

[11] Patent Number: 5,067,137
[45] Date of Patent: Nov. 19, 1991

[54] ADJACENT CHANNEL INTERFERENCE CANCELLER WITH MEANS FOR MINIMIZING INTERSYMBOL INTERFERENCE

[75] Inventor: Ichiro Kaneko, Tokyo, Japan
[73] Assignee: NEC Corporation, Tokyo, Japan
[21] Appl. No.: 501,901
[22] Filed: Mar. 30, 1990

[30] Foreign Application Priority Data

Mar. 31, 1989 [JP] Japan ................................. 1-82810

[51] Int. Cl.$^5$ .............................................. H04B 3/06
[52] U.S. Cl. ..................................... 375/14; 375/101; 333/18
[58] Field of Search .................... 375/12, 14, 101, 103; 333/18, 28 R; 370/6, 32.1; 455/295, 303, 306; 324/475

[56] References Cited

U.S. PATENT DOCUMENTS

| | | | |
|---|---|---|---|
| 4,422,175 | 12/1983 | Bingham et al. | 375/14 |
| 4,530,104 | 7/1985 | Kamerman | 375/14 |
| 4,701,936 | 10/1987 | Clark et al. | 375/14 |
| 4,890,298 | 12/1989 | Galpin | 375/14 |

*Primary Examiner*—Benedict V. Safourek
*Attorney, Agent, or Firm*—Sughrue, Mion, Zinn, Macpeak & Seas

[57] ABSTRACT

A device for use in processing a device input signal carrying a digital symbol sequence, a reception filter filters the device input signal and produces a filter output signal having a high order curvature distortion. The high order curvature distortion results in a predetermined frequency band from adjacent interference on the predetermined frequency band by other frequency bands adjacant to the predetermined frequency band. Responsive to the filter output signal, an adaptive amplitude equalizing unit equalizes the high order curvature distortion and produces as a first equalized signal. When the device input signal decreases, the adaptive amplitude equalizing unit overestimates the high order curvature distortion to produce intersymbol interference because of appropriately suppressing the other freqency bands by the reception filter. In order to resolve the problem, an adaptive transversal equalizing unit is connected to the adaptive amplitude equalizing unit and equalizes the intersymbol interference along a time axis of the first equalized signal to produce an output signal with the curvature distortion and the intersymbol interference suppressed.

2 Claims, 4 Drawing Sheets

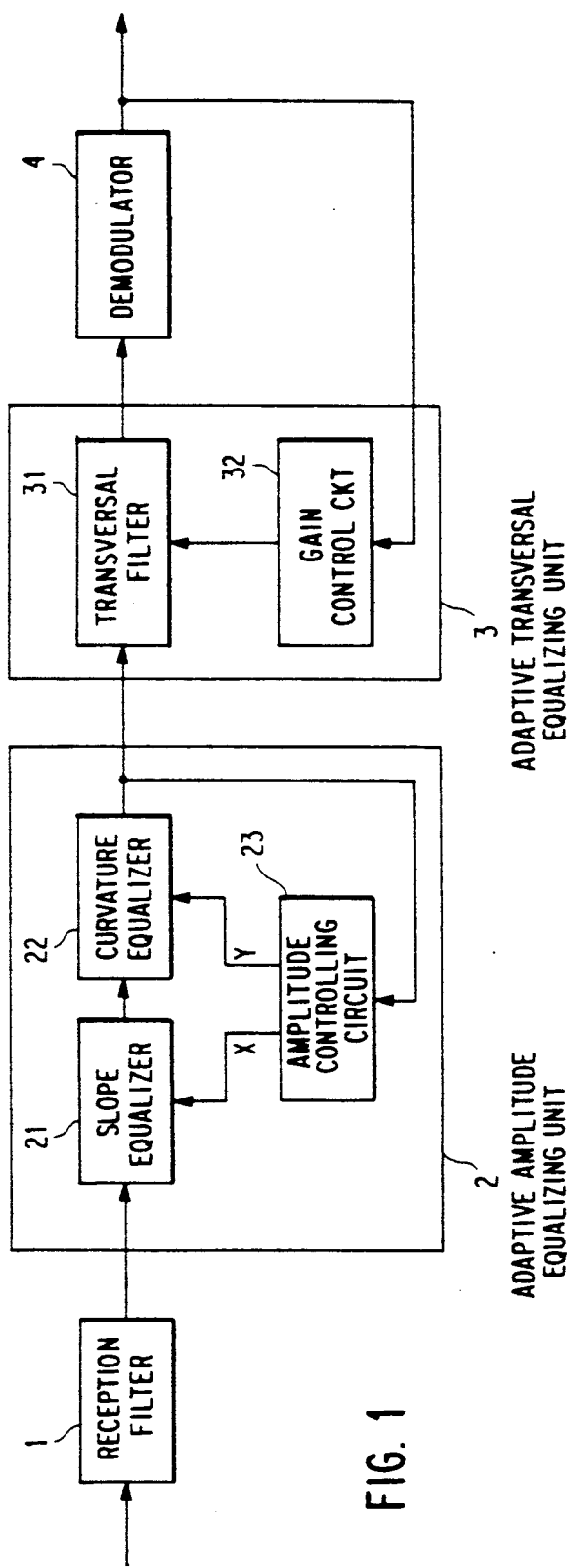

ADJACENT CHANNEL INTERFERENCE CANCELLER WITH MEANS FOR MINIMIZING INTERSYMBOL INTERFERENCE

BACKGROUND OF THE INVENTION

This invention relates to a device such as an adjacent channel interference canceller for processing a device input signal carrying a digital symbol sequence timed by a reference clock signal to produce a device output signal to a demodulator. The demodulator demodulates the device output signal into a reproduced clock signal, a reproduced symbol sequence, and a digital error signal. The reproduced clock signal is a reproduction of the reference clock signal. The reproduced symbol sequence is a reproduction of the digital symbol sequence.

In general, a device of the type described is supplied with a device input signal carrying the digital symbol sequence. The device comprises a reception filter for filtering the device input signal to produce a filter output signal. The filter output signal has an amplitude distortion resulting in a desired frequency band from adjacent interference on the desired frequency band by one or two frequency bands adjacent to the desired frequency band. The device serves to equalize the amplitude distortion, as well known in the art.

A conventional device is disclosed in U.S. Pat. No. 4,333,063 issued to Toshihiko Ryu and assigned to the instant assignee. According to Ryu, the device comprises an adaptive amplitude equalizing unit responsive to the filter output signal for equalizing the amplitude distortion along a frequency axis of the filter output signal to produce an amplitude equalized signal as the device output signal.

The device input signal has an intermediate level at a center of the desired frequency band. The desired frequency band is adjacent to one or two other frequency bands at sides of the other frequency bands. The device input signal has side levels at the sides of the desired frequency band. Therefore, the device input signal inevitably includes the side levels as its level components in two regions of the desired frequency band that are adjacent to the other frequency bands.

It has now been found that intersymbol interference is produced in the amplitude equalized signal by oversuppression to the side levels on the Ryu's adaptive amplitude equalizing unit. This is because the side levels could not appropriately suppressed by the reception filter.

The device input signal has a decrease in the intermediate level when subjected to fading or the like. The side levels are usually lower than the intermediate level.

When the decrease occurs, the side levels are overestimated to be higher than the intermediate level. As a result, the adaptive amplitude equalizing unit operatively over-suppresses the side levels to produce the amplitude equalized signal accompanied by the intersymbol interference.

SUMMARY OF THE INVENTION

It is an object of this invention to provide a device capable of minimizing intersymbol interference produced by oversuppression of side levels at the sides of a desired frequency band.

This invention is applicable to a device for use in processing a device input signal carrying a digital symbol sequence to produce a device output signal. The device comprises a reception filter for filtering the device input signal to produce a filter output signal having an amplitude distortion resulting in a predetermined frequency band from adjacent interference on the predetermined frequency band by other frequency bands adjacent to the predetermined frequency band, and first adaptive equalizing means responsive to the filter output signal for equalizing the amplitude distortion along a frequency axis of the filter output signal to produce a first equalized sigal having intersymbol interference. According to this invention, the device further comprises second adaptive equalizing means responsive to the first equalized signal for equalizing the intersymbol interference along a time axis of the first equalized signal to produce a second equalized signal as the device output signal.

BRIEF DESCRIPTION OF THE DRAWING

FIG. 1 is a block diagram view of a device according to an embodiment of the present invention;

FIG. 2($a$) shows a view of the spectrum of a device input signal;

FIG. 2($b$) shows a view of the spectrum of a filter output signal;

FIG. 2($c$) shows a view of the spectrum of a first equalized signal accompanied by intersymbol interference;

FIG. 2($d$) shows a view of the spectrum of a second equalized signal with the intersymbol interference minimized;

DESCRIPTION OF THE PREFERRED EMBODIMENTS

Figure 3:
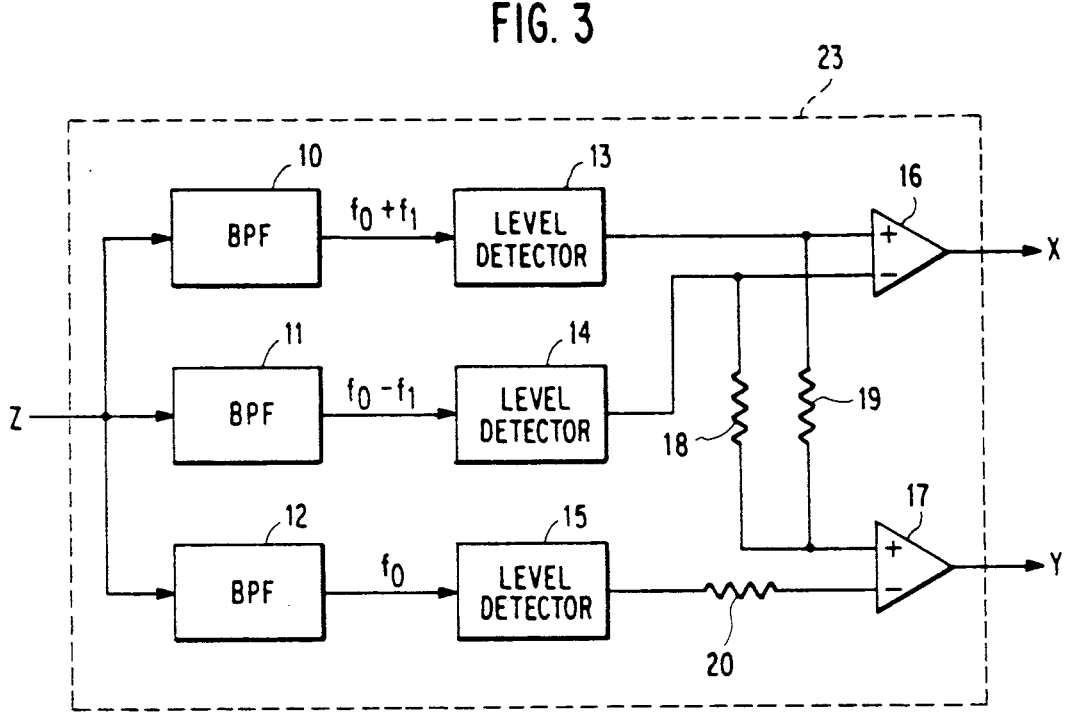
FIG. 3 is a block diagram view of an amplitude controlling circuit used in the device of FIG. 1.

A device in accordance with the present invention is supplied with a device input signal subjected to modulation at a predetermined modulation rate and produces a device output signal. The device input signal carries a digital symbol sequence being timed by a reference clock signal.

Referring to FIG. 1, the device comprises a reception filter 1 supplied with the device input signal, an adaptive amplitude equalizing unit 2, and an adaptive transversal equalizing unit 3 for delivering the device output signal to a demodulator 4.

The reception filter 1 is for filtering the device input signal to deliver a filter output signal to the adaptive amplitude equalizing unit 2.

Referring to FIG. 2($a$), the device input signal comprises a desired frequency band signal A and other frequency band components B and C. The filter output signal is the desired frequency band signal A and accompanied with an amplitude distortion due to the other frequency band components B and C, as shown in FIG. 2($b$). This is because the other frequency band signals B and C could not be appropriately suppressed by the reception filter 1.

The amplitude distortion comprises a linear shape distortion and a high order curvature distortion. The linear slope distortion is determined by a linear slope component and a slope polarity. The high order curvature distortion includes a secondary curvature distortion and the higher order ones. The high order curvature distortion is determined by a high order curvature component and a curvature polarity so that the secondary curvature distortion is defined by a secondary order curvature component and a curvature slope.

The following description will be made as regards the linear slope distortion and the secondary curvature distortion.

Returning to FIG. 1, the adaptive amplitude equalizing unit 2 includes a slope equalizer 21 and a curvature equalizer 22 cascaded thereto. The equalizers 21 and 22 can be designed to equalize the linear slope distortion and the high order curvature distortion of the filter output signal, respectively.

The filter output signal is applied to the slope equalizer 21. The slope equalizer 21 equalizes the linear slope distortion to produce a slope equalized signal in response to a slope control signal X.

The slope equalized signal is applied to the curvature equalizer 22. The curvature equalizer 22 equalizes the secondary curvature distortion in response to a secondary curvature control signal Y. Then, the curvature equalizer 22 provides a curvature equalized signal as a first equalized signal to an amplitude control circuit 23 and to the adaptive transversal equalizing unit 3.

Referring to FIG. 3, the amplitude control circuit 23 includes three narrow bandpass filters 10, 11 and 12 having respective center frequencies of (f0+f1), (f0−f1) and f0, where f0 is a center frequency of the desired frequency band A and f1 is a predetermined frequency width. The center frequencies of (f0+f1) and (f0−f1) are called side frequencies. The first equalized signal from the curvature equalizer 22 is applied in common to each of the bandpass filters 10, 11, and 12. The outputs from the bandpass filters 10, 11, and 12 are applied to three level detectors 13, 14, and 15, respectively.

The outputs of the level detectors 13 and 14 are applied to a non-inverting and an inverting inputs, respectively, of a first differential amplifier 16 to produce the linear slope component and the slope polarity as the slope control signal X which is supplied into the slope equalizer 21.

The outputs of the level detectors 13 and 14 are coupled to a non-inverting input of a second differential amplifier 17, through resistors 19 and 18, respectively. The output of the level detector 15 is applied to an inverting input of the second differential amplifier 17 through a resistor 20 to produce the secondary curvature component and the curvature polarity as the curvature control signal Y which is supplied into the curvature equalizer 22.

Figure 4:
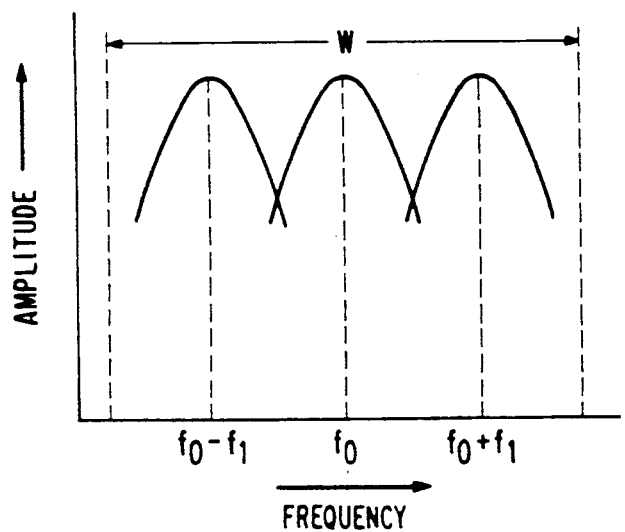
FIG. 4 shows a view of characteristic curves of three filters in the amplitude controlling circuit of FIG. 3.

FIG. 4 illustrates the amplitude vs. frequency characteristics of the filters 10-12, W denoting a bandwidth of the desired frequency band signal A.

The first differential amplifier 16 compares the signal components of the side frequencies (f0+f1) and (f0−f1) to detect the linear slope component and the slope polarity thereof.

The second differential amplifier 17 compares the signal component of the frequency (f0) and an average value between the signal components of the side frequencies (f0+f1) and (f0−f1) to detect the secondary curvature component and the curvature polarity thereof. If the adaptive amplitude equalizing unit 2 is designed to equalize only the secondary or higher order curvature components, the slope equalizer 21 and the first differential amplifier 16 may be omitted.

When the desired frequency band decreases by being subjected to fading, the signal component of the side frequencies (f0+f1) and (f0−f1) are overestimated to be higher than the signal component of the center frequency (f0). As a result, the second differential amplifier 17 detects an overestimated secondary curvature component. Accordingly, the curvature equalizer 22 operatively over-suppresses the signal components of the side frequencies (f0+f1) and (f0−f1) to produce the first equalized signal accompanied by an intersymbol interference, as shown in FIG. 2(c).

Figure 5:
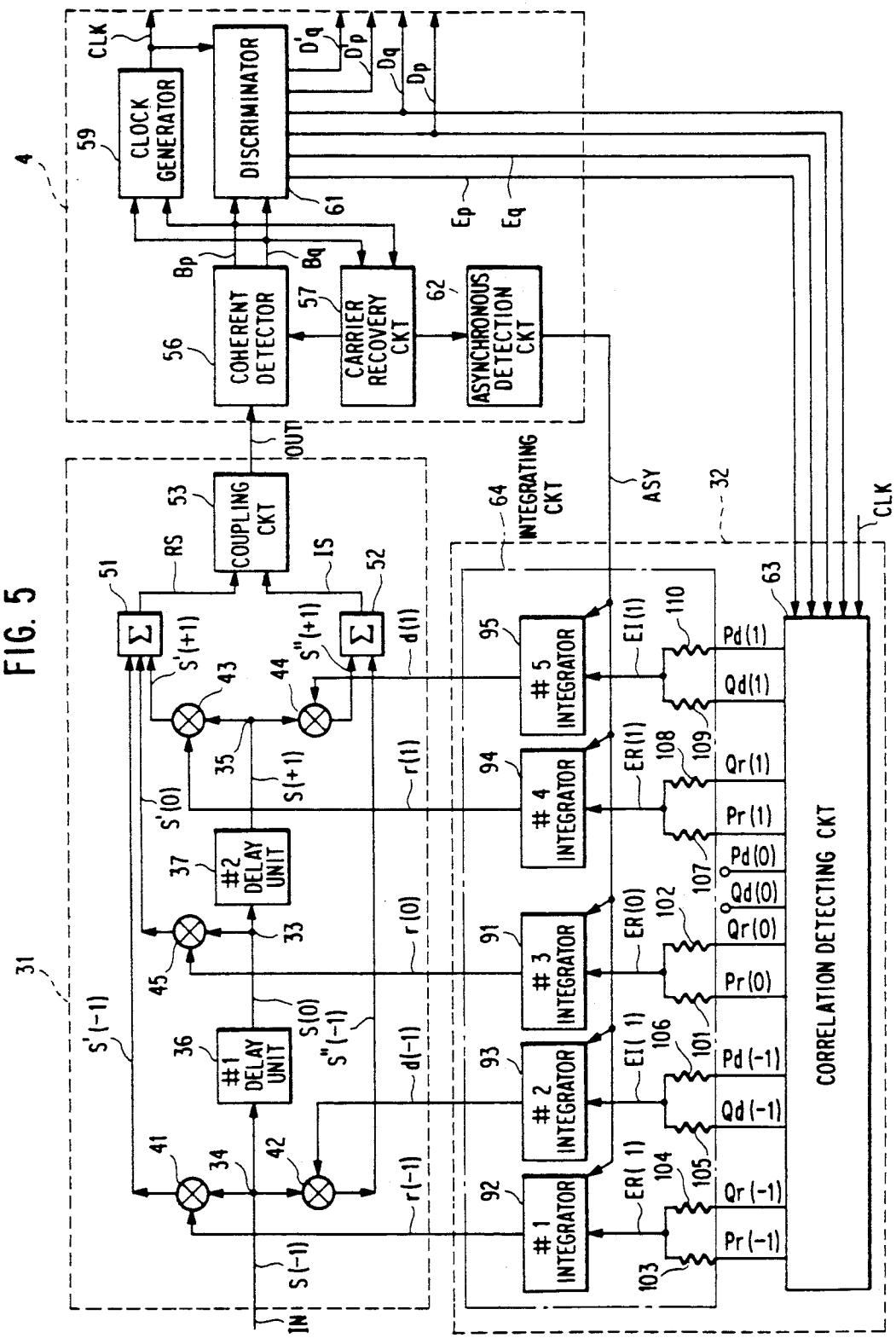
FIG. 5 shows a block diagram view of an adaptive transversal equalizing unit and a demodulator used in the device of FIG. 1.

Referring to FIGS. 1 and 5, the adaptive transversal equalizing unit 3 is supplied with the first equalized signal accompanied by the intersymbol interference and comprises a transversal filter 31 for filtering the first equalized signal IN into a second equalized signal as the device output signal OUT in response to a plurality of controllable tap gains which may be specified by $C(-1)$, $C(0)$, and $C(+1)$. The device output signal OUT is also subjected to four-by-four quadrature amplitude modulation like the first equalized signal IN but is equalized by the transversal filter 31. The illustrated transversal filter 31 has three taps. A central one of the three taps may be called a central or a first tap 33. The remaining ones of the taps are depicted on the lefthand and the righthand sides of the central tap 33 and may be called second and third taps 34 and 35, respectively. The second and the third taps 34 and 35 may be referred to as first and second additional taps.

First and second delay units 36 and 37 are placed between the second and the first taps 34 and 33 and between the first and the third taps 33 and 35, respectively. Each of the first and the second delay units 36 and 37 provides a delay which is substantially equal to a reciprocal of the predetermined modulation rate. The first equalized signal IN is delivered to the second tap 34 as a first one of additional tap signals and successively delayed by the first and the second delay units 36 and 37 to be produced as a central tap signal and a second additional tap signal which are sent to the first and the third taps 33 and 35, respectively.

Let the second, the first, and the third taps 34, 33, and 35 be specified by consecutive numbers of $(-1)$, 0, and $(+1)$, respectively, taking the successive delays into consideration. In this connection, the first additional tap signal appearing as the $(-1)$ tap 34 may be specified by $S(-1)$. Likewise, the central and the second additional tap signals may be specified by $S(0)$ and $S(+1)$, respectively.

Inasmuch as the first equalized signal IN is subjected to over-suppression (referring to FIG. 2(c)), the first equalized signal IN includes an in-phase and a quadrature phase component. The in-phase and the quadrature phase components are individually processed with reference to the central tap signal $S(0)$. More specifically, the first additional tap signal $S(-1)$ is delivered to a first in-phase multiplier 41 and a first quadrature multiplier 42. The second additional tap signal $S(+1)$ is delivered to a second in-phase multiplier 43 and a second quadrature multiplier 44. The central tap signal $S(0)$ is given to a central in-phase multiplier 45 alone because no quadrature phase component is present in the central tap signal S(0). Each of the multipliers 41 to 45 may be referred to as a weighting circuit.

The controllable tap gains C(0), C(−1), and C(+1) are produced by a gain control circuit 32 as will later be described in detail. The controllable tap gains C(0), C(−1), and C(+1) may be referred to as a central complex control signal, first and second complex control signals, respectively. The central complex control signal C(0) consists of a real part alone and is therefore represented by r(0) in FIG. 6. On the other hand, each of the first and the second complex control signals C(−1) and C(+1) consists of a real part and an imaginary part represented by r and d, respectively. In FIG. 5, the first complex control signal C(−1) is specified by a combination of r(−1) and d(−1) while the second complex control signal C(+1), a combination of r(1) and d(1).

As shown in FIG. 5, the real and the imaginary parts r(−1) and d(−1) of the first complex control signal C(−1) are delivered from the gain control circuit 32 to the first in-phase and the first quadrature multipliers 41 and 42, respectively. Likewise, the real and the imaginary parts r(1) and d(1) of the second complex control signal C(+1) are delivered to the second in-phase and the second quadrature multipliers 43 and 44, respectively. The central complex control signal C(0) or r(0) is sent to the central in-phase multiplier 45 in a usual manner.

The first in-phase and the first quadrature multipliers 41 and 42 supply first and second adders 51 and 52 with a first controlled in-phase component S'(−1) and a first controlled quadrature component S"(−1), respectively. The second in-phase and the second quadrature multipliers 43 and 44 supply the first and the second adders 51 and 52 with a second controlled in-phase component and a second controlled quadrature component which are represented by S'(+1) and S"(+1), respectively. Each of the first and the second in-phase components may be named a first controlled signal while each of the first and the second quadrature components is named a second controlled signal. A central controlled in-phase component S'(0) is sent from the central in-phase multiplier 45 to the first adder 51.

The first and the second adders 51 and 52 carry out addition to produce an in-phase signal RS and a quadrature signal IS representative of results of the addition, respectively. The in-phase and the quadrature signals RS and IS may be called first and second processed signals, respectively. In this connection, the first and the second adders 51 and 52 may be referred to as first and second processing circuits, respectively. The in-phase and the quadrature signals RS and IS are combined together by a coupling circuit 53 into a coupled signal with a quadrature phase relation kept between the in-phase and the quadrature signals RS and IS. The coupled signal is sent as the second equalized signal OUT to a demodulator 4.

The demodulator 4 comprises a coherent detector 56 responsive to the second equalized signal OUT and to a recovered carrier wave supplied from a carrier recovery circuit 57. The coherent detector 56 carries out coherent detection with reference to the receovered carrier wave to produce a demodulated baseband signal. The demodulated baseband signal consists of an in-phase and a quadrature component represented by Bp and Bq, respectively. The in-phase and the quadrature components Bp and Bq have an in-phase and a quadrature level, respectively. Responsive to the in-phase and the quadrature components Bp and Bq of the baseband signal, a clock generator 59 delivers a reproduced clock signal CLK to both of the gain control circuit 32 and a discriminator 61. The reproduced clock signal CLK is a reproduction of the reference clock signal. The discriminator 61 produces a reproduced symbol sequence D. The reproduced symbol sequence is a reproduction of the transmission data sequence. The reproduced symbol sequence D consists of in-phase symbol components Dp and D'p and of quadrature symbol components Dq and D'q. The in-phase symbol components Dp and D'p represent the in-phase level of the in-phase component Bp of the demodulated baseband signal. Likewise, the quadrature symbol components Dq and D'q represent the quadrature level of the quadrature component Bq of the demodulated baseband signal. The discriminator 61 also produces a digital error signal E. The digital error signal E is related to the intersymbol interference. The digital error signal E consists of an in-phase and a quadrature error component Ep and Eq which correspond to the in-phase and the quadrature symbol components Dp and Dq, respectively.

The carrier recovery circuit 57 additionally produces the recovered carrier wave in response to the in-phase and the quadrature components Bp and Bq of the demodulated baseband signal. The carrier recovery circuit 57 is coupled to an asynchronous detection circuit 62. The asynchronous detection circuit 62 monitors the carrier recovery circuit 57 to detect an asynchronous state of the equalizer and to produce an asynchronous state signal ASY representative of the asynchronous state when the asynchronous detection circuit 62 detects the asynchronous state.

The in-phase and the quadrature error components Ep and Eq of the digital error signal E and the in-phase and the quadrature symbol components Dp and Dq of the reproduced symbol sequence D are delivered from the demodulator 4 to the gain control circuit 32 together with the reproduced clock signal CLK and the asynchronous state signal ASY.

Responsive to the reproduced clock signal CLK, to the in-phase and the quadrature error components Ep and Eq of the digital error signal E, and to the in-phase and the quadrature symbol components Dp and Dq of the reproduced symbol sequence D, the gain control circuit 32 controls the controllable tap gains C(j) by the use of a zero forcing (ZF) algorithm where j represents a tap number, such as 0, (−1), and (+1). It will be assumed that a k-th time k is prior to a (k+1)-th time (k+1) by a repetition period of the reproduced clock signal CLK. According to the zero forcing algorithm, controllable tap gains C(j, k+1) at the (k+1)-th time (k+1) are decided by a combination of a digital error signal E(k) at the k-th time k, a reproduced symbol sequence D(k−j) at a (k−j)-th time (k−j), and controllable tap gains C(j, k) at the k-th time k as follows:

$$C(j, k+1) = C(j, k) - \Delta \left[ sgn \left( \sum_{k=1}^{H} D^*(k-j) \times E(k) \right) \right] \quad (1)$$

$$C(j, k) = r(j)(k) + id(j)(k) \quad (2)$$
$$E(k) = Ep(k) + iEq(k) \quad (3)$$
$$D^*(k-j) = Dp(k-j) - iDq(k-j) \quad (4)$$

where $\Delta$ represents a fixed incremental step size, i represents an imaginary unit which is equal to $\sqrt{-1}$, the notation "sgn" represents a polarity of the argument enclosed with a pair of braces, H represents a positive integer.

The controllable tap gains C(j, k+1) have real and imaginary parts r(j, k+1) and d(j, k+1) which are given by:

$$r(j, k + 1) = r(j, k) - \Delta \left[ sgn \left\{ \sum_{k=1}^{H} (Ep(k) \oplus Dp(k - j) + Eq(k) \oplus Dq(k - j)) \right\} \right] \quad (5)$$

$$d(j, k + 1) = d(j, k) - \Delta \left[ sgn \left\{ \sum_{k=1}^{H} (Eq(k) \oplus Dq(k - j) + Ep(k) \odot Dq(k - j)) \right\} \right] \quad (6)$$

where the symbol $\oplus$ is used as an Exclusive-OR operator and the symbol $\odot$ is used as an Exclusive-NOR operator.

The gain control circuit 32 comprises a correlation detecting circuit 63 and an integrating circuit 64. The correlation detecting circuit 63 is for finding out cross-correlation between the reproduced symbol sequence D(m) and the digital error signal E(m) to produce a plurality of correlation signals. The integrating circuit 64 is for integrating the correlation signals to produce a plurality of integrated signals as the controllable tap gains C(j).

Figure 6:
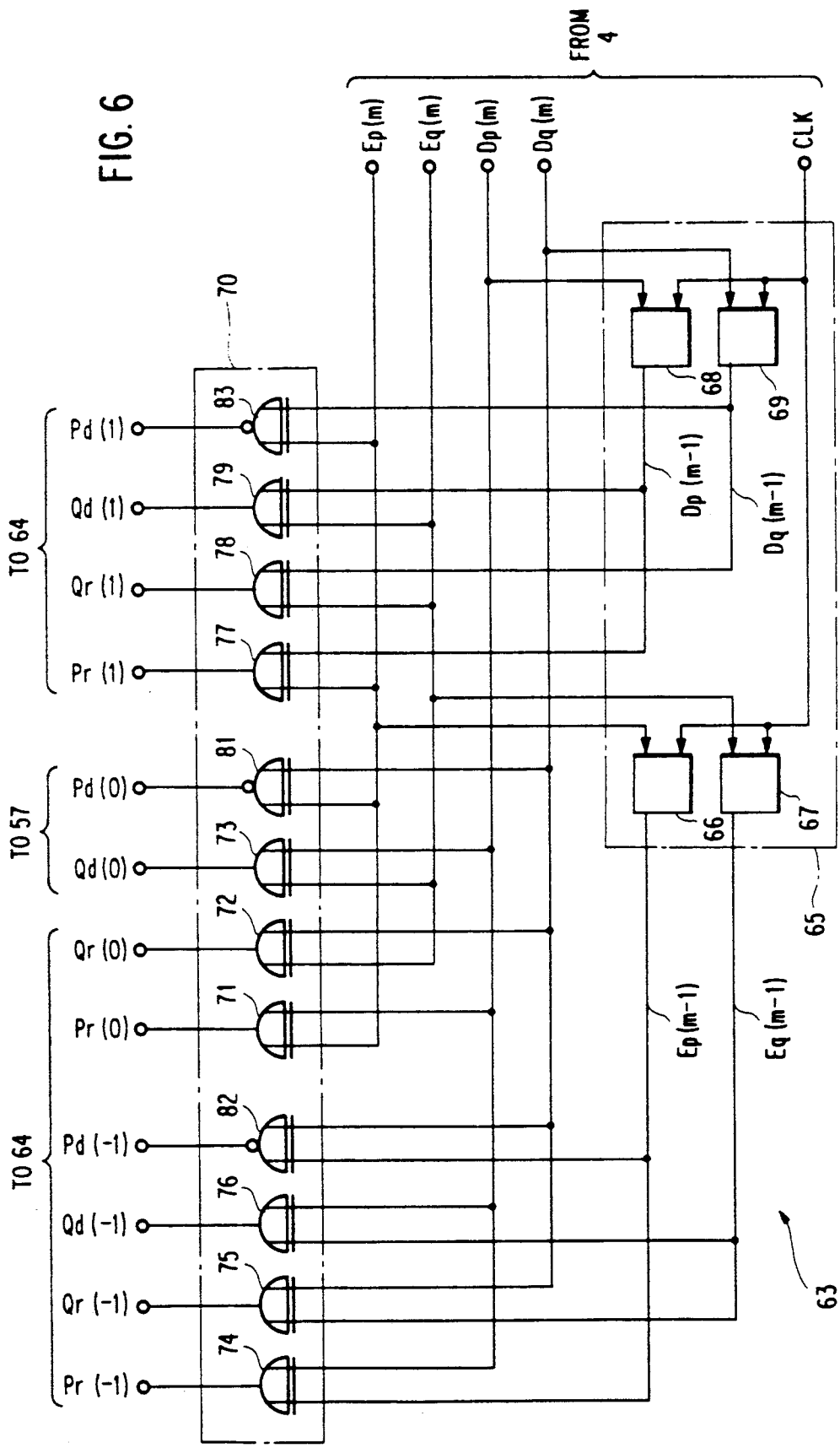
FIG. 6 shows a block diagram view of a correlation detection circuit in the adaptive transversal equalizing unit of FIG. 5.

Referring to FIG. 6, the correlation detecting circuit 63 comprises a delaying circuit 65 and an Exclusive logic circuit 70. The delaying circuit 65 is for delaying the reproduced symbol sequence D(m) and the digital error signal E(m) to produce a delayed symbol sequence D(m−1) and a delayed error signal E(m−1) in synchronism with the reproduced clock signal CLK. The delayed symbol sequence D(m−1) and the delayed error signal E(m−1) are delayed by one repetition period of the reproduced clock signal CLK relative to the reproduced symbol sequence D(m) and the digital error signal E(m), respectively. More particularly, the delaying circuit 65 comprises first through fourth flip flops 66, 67, 68, and 69. The delayed clock signal CLK is delivered to the flip flops 66 through 69. The first flip flop 66 is for delaying an in-phase error component Ep(m) of the digital error signal E(m) to produce a delayed in-phase error component Ep(m−1) of the delayed error signal E(m−1) in synchronism with the reproduced clock signal CLK. Likewise, the second flip flop 67 is for delaying a quadrature error component Eq(m) of the digital error signal E(m) to produce a delayed quadrature error component Eq(m−1) of the delayed error signal E(m−1) in synchronism with the reproduced clock signal CLK. The third and the fourth flip flops 68 and 69 are for delaying in-phase and quadrature symbol components Dp(m) and Dq(m) of the reproduced symbol sequence D(m) to produce delayed in-phase and delayed quadrature symbol components Dp(m−1) and Dq(m−1) of the delayed symbol sequence D(m−1), respectively, in synchronism with the reproduced clock signal CLK.

The delayed symbol sequence D(m−1), the delayed error signal E(m−1), the reproduced symbol sequence D(m), and the digital error signal E(m) are supplied to the Exclusive logic circuit 70 as a plurality of input signals. The Exclusive logic circuit 70 is for carrying out an exclusive logic operation on the input signals to produce the correlation signals. The Exclusive logic circuit 70 comprises first through ninth Exclusive-OR gates 71, 72, 73, 74, 75, 76, 77, 78, and 79, and first through third Exclusive-NOR gates 81, 82, and 83. More particularly, the first Exclusive-OR gate 71 carries out an exclusive OR operation on the in-phase error component Ep(m) and the in-phase symbol component Dp(m) to produce a first correlation signal Pr(0). Therefore, the first correlation signal Pr(0) is given by:

$$Pr(0) = Ep(m) \oplus Dp(m).$$

Similarly, the second Exclusive-OR gate 72 carries out an exclusive OR operation on the quadrature error component Eq(m) and the quadrature symbol component Dq(m) to produce a second correlation signal Qr(0). The second correlation signal Qr(0) is given by:

$$Qr(0) = Eq(m) \oplus Dq(m).$$

Likewise, the third Exclusive-OR gate 73 carries out an exclusive OR operation on the quadrature error component Eq(m) and the in-phase data component Dp(m) to produce a third correlation signal Qd(0). The third correlation signal Qd(0) is given by:

$$Qd(0) = Eq(m) \oplus Dp(m).$$

The first Exclusive-NOR gate 81 carries out an exclusive NOR operation on the in-phase error component Ep(m) and the quadrature symbol component Dq(m) to produce a fourth correlation signal Pd(0). The fourth correlation signal Pd(0) is given by:

$$Pd(0) = Ep(m) \odot Dq(m).$$

In this manner, the fourth, the fifth, and the sixth Exclusive-OR gates 74, 75, and 76, and the second Exclusive-NOR gate 82 produce fifth, sixth, seventh, and eighth correlation signals Pr(−1), Qr(−1), Qd(−1), and Pd(−1) which are given by:

$$Pr(-1) = Ep(m-1) \oplus Dp(m),$$

$$Qr(-1) = Eq(m-1) \oplus Dq(m),$$

$$Qd(-1) = Eq(m-1) \oplus Dp(m),$$

and $$Pd(-1) = Ep(m-1) \odot Dq(m).$$

Similarly, the seventh, the eighth, and the ninth Exclusive-OR gates 77, 78, and 79, and the third Exclusive-NOR gate 83 produce ninth, tenth, eleventh, and twelfth correlation signals Pr(1), Qr(1), Qd(1), and Pd(1) which are given by:

$$Pr(1) = Ep(m) \oplus Dp(m-1),$$

$$Qr(1) = Eq(m) \oplus Dq(m-1),$$

$$Qd(1) = Eq(m) \oplus Dp(m-1),$$

and $$Pd(1) = Ep(m) \ Dq(m-1).$$

The correlation signals except for the third and the fourth correlation signals Qd(0) and Pd(0) are supplied to the integrating circuit 64.

Although the in-phase and the quadrature components Bp and Bq of the demodulated baseband signal are supplied to the carrier recovery circuit 57 as mentioned above, the in-phase and the quadrature components Bp and Bq of the demodulated baseband signal may not be always supplied to the carrier recovery circuit 57. In this case, the third and the fourth correlation signals Qd(0) and Pd(0) is used instead of the in-phase and the quadrature components Bp and Bq of the demodulated baseband signal.

Turning back to FIG. 5, the integrating circuit 64 comprises first through fifth resettable integrators 91, 92, 93, 94, and 95. The first resettable integrator 91 is coupled through first and second registers 101 and 102 to the first and the second Exclusive-OR gates 71 and 72. Similarly, the second resettable integrator 92 is coupled through third and fourth registers 103 and 104 to the fourth and the fifth Exclusive-OR gates 74 and 75. The third resettable integrator 93 is coupled through fifth and sixth registers 105 and 106 to the sixth Exclusive-OR gate 76 and the second Exclusive-NOR gate 82. The fourth resettable integrator 94 is coupled through seventh and eighth registers 107 and 108 to the seventh and eighth Exclusive-OR gates 77 and 78. The fifth resettable integrator 95 is coupled through ninth and tenth registers 109 and 110 to the ninth Exclusive-OR gate 79 and the third Exclusive-NOR gate 83.

A pair of the first and the second registers 101 and 102 are for combining the first correlation signal Pr(0) and the second correlation signal Qr(0) to produce a first combined signal ER(0). Therefore, the first combined signal ER(0) is given by:

$$\begin{aligned} ER(0) &= Pr(0) + Qr(0) \\ &= Ep(m) \oplus Dp(m) + Eq(m) \oplus Dq(m). \end{aligned}$$

Similarly, another pair of the third and the fourth registers 103 and 104 are for combining the fourth correlation signal Pr(−1) and the fifth correlation signal Qr(−1) to produce a second combined signal ER(−1) which is given by:

$$\begin{aligned} ER(-1) &= Pr(-1) + Qr(-1) \\ &= Ep(m-1) \oplus Dp(m) + Eq(m-1) \oplus Dq(m). \end{aligned}$$

In this manner, pairs of the fifth and the sixth registers 105 and 106, the seventh and the eighth registers 107 and 108, and the ninth and the tenth registers 109 and 110 produce third, fourth, and fifth combined signals EI(−1), ER(1), and EI(1), respectively, which are given by:

$$\begin{aligned} EI(-1) &= Qd(-1) + Pd(-1) \\ &= Eq(m-1) \oplus Dp(m) + Ep(m-1) \ Dq(m), \\ ER(1) &= Pr(1) + Qr(1) \\ &= Ep(m) \oplus Dp(m-1) + Eq(m) \oplus Dq(m-1), \text{ and} \\ EI(1) &= Qd(1) + Pd(1) \\ &= Eq(m) \oplus Dp(m-1) + Ep(m) \ Dq(m-1). \end{aligned}$$

The first through the fifth resettable integrators 91 to 95 are coupled to the asynchronous detecting circuit 62. When the asynchronous state signal ASY is given from the asynchronous detecting circuit 62 to the first through the fifth resettable integrators 91 to 95, the first resettable integrators 91 is reset into a logic "1" level and is kept at the logic "1" level. Each of the remaining integrators 92 to 95 is reset into a logic "0" level. In the absence of the asynchronous state signal ASY, each of the integrators 91 to 95 works out a time average of each combined signal ER(0), ER(−1), EI(−1), ER(1), and EI(1) to remove an unnecessary noise component from each combined signal. Anyway, the first through the fifth integrators 92 to 95 produce the controllable tap gains C(0), C(−1), and C(+1).

The first through the tenth registers 101 to 110 are for use in combining each pair of the correlation signals as mentioned above. However, OR gates may be used instead of the first through the tenth registers 101 to 110.

Referring to FIG. 2(d), it will be understood that the adaptive transversal equalizing unit 3 is operable for minimizing the intersymbol interference. Therefore, the device according to this invention can cancel all distortion due to the adjacent channel interference.

What is claimed is:

1. A device for use in processing a device input signal carrying a digital symbol sequence to produce a device output signal, said device comprising a reception filter for filtering said device input signal to produce a filter output signal having an amplitude distortion resulting in a predetermined frequency band from adjacent interference on said predetermined frequency band by other frequency bands adjacent to said predetermined frequency band, said amplitude distortion including a linear slope distortion and a high order curvature distortion, the device comprising:

adaptive amplitude equalizing means including a slope equalizer and a curvature equalizer, said slope equalizer being responsive to said filter output signal for equalizing said linear slope distortion to produce a slope equalized signal, said curvature equalizer being responsive to said slope equalized signal for equalizing said high order curvature distortion to produce a first equalized signal having intersymbol interference; and adaptive transversal equalizing means responsive to said first equalized signal for equalizing said intersymbol interference to produce a second equalized signal as said device output signal.

2. A device as claimed in claim 1, said digital symbol sequence being timed by a reference clock signal, said device being connected to a demodulator which is for demodulating said device output signal into a reproduced clock signal and a reproduced symbol sequence accompanied by a digital error signal, said reproduced clock signal being a reproduction of said reference clock signal, said reproduced symbol sequence being a reproduction of said digital symbol sequence, said digital error signal being related to said intersymbol interference, and wherein said adaptive transversal equalizing means comprises:

a transversal filter which has a plurality of taps having controllable tap gains and is connected to said adaptive amplitude equalizing means and to said demodulator for equalizing said intersymbol interference to produce said second equalized signal in response to said tap gains and to supply said second equalized signal to said demodulator; and gain controlling means connected to said demodulator and responsive to said reproduced symbol sequence and to said digital error signal for controlling said tap gains so as to minimize said intersymbol interference.

* * * * *

UNITED STATES PATENT AND TRADEMARK OFFICE
CERTIFICATE OF CORRECTION

PATENT NO. : 5,067,137

DATED : November 19, 1991

INVENTOR(S) : Ichiro KANEKO

It is certified that error appears in the above-identified patent and that said Letters Patent is hereby corrected as shown below:

Title page, item [57]:
Abstract, line 16, delete "freqency", insert --frequency--;

Col. 1, line 49, after "not", insert --be--;

Col. 2, line 10, delete "sigal", insert --signal--;

Col. 5, line 62, delete "receovered", insert --recovered--;

Col. 6, line 68, delete "$\sqrt{}\,-1$", insert --$\sqrt{-1}$--;

Col. 7, line 19, after "(K)", insert --⊙--;

Col. 7, line 23, after "symbol", insert --⊙--;

Col. 8, line 34, after "Ep(m)", insert --⊙--;

Col. 8, line 40, after "Ep(m)", insert --⊙--.

UNITED STATES PATENT AND TRADEMARK OFFICE
CERTIFICATE OF CORRECTION

PATENT NO. : 5,067,137
DATED : November 19, 1991
INVENTOR(S) : Ichiro KANEKO

It is certified that error appears in the above-identified patent and that said Letters Patent is hereby corrected as shown below:

Col. 8, line 54, after "(m-1)", insert --$\odot$--.
Col. 9, line 2, after "(m)", insert --$\odot$--.
Col. 9, line 62, after "Ep(m-1)", insert --$\odot$--.
Col. 9, line 67, after "Ep(m)", insert --$\odot$--.

Signed and Sealed this

Twenty-first Day of December, 1993

Attest:

BRUCE LEHMAN

*Attesting Officer*       *Commissioner of Patents and Trademarks*